(12) United States Patent
Stewart et al.

(10) Patent No.: US 6,333,958 B1
(45) Date of Patent: Dec. 25, 2001

(54) ADVANCED ELECTRONICS FOR FASTER TIME-CORRELATION ANALYSIS OF PULSE SEQUENCES

(76) Inventors: James E. Stewart, 111 Piedra Loop; Merlyn S. Krick, 3 La Flora Ct.; Steven C. Bourret, 1 Arbol Ct.; Martin R. Sweet, 1912 Camino Manzana, all of Los Alamos, NM (US) 87544

( * ) Notice: Subject to any disclaimer, the term of this patent is extended or adjusted under 35 U.S.C. 154(b) by 0 days.

(21) Appl. No.: 09/562,467

(22) Filed: May 1, 2000

Related U.S. Application Data

(60) Provisional application No. 60/155,049, filed on Sep. 21, 1999.

(51) Int. Cl.[7] .................................................. G06M 11/02
(52) U.S. Cl. .................................. 377/10; 377/6; 377/19; 250/390.01; 376/153; 376/154; 376/155
(58) Field of Search ............................. 250/390.01, 392; 376/153, 154, 155; 377/6, 10, 19

(56) References Cited

U.S. PATENT DOCUMENTS 4,920,271 * 4/1990 Arnone ........................... 250/390.01

OTHER PUBLICATIONS

*A New System for Analyzing Neutron Multiplicities: Characterization and Some Specific Applications*, G.S. Brunson and G. J. Arnone, Los Alamos Informal Report No. LA–11701–MS (DE90 002327), Nov. 1989.

*A Pulse Generator for Testing Shift–Register Coincidence Electronics*, S.C. Bourret, M.S. Krick, and A. Romero, Publication No. LA–UR–97–2783, presented at the Institute of Nuclear Materials Management 38th Annual Meeting, Phoenix, AZ, Jul. 1997.

*Recent Developments in Multiplicity Counting Hardware at Los Alamos*, J. K. Halbig, et al., Publication No. LA–UR–91–3571, presented at the 1991 IEEE Nuclear Science Symposium and Medical Imaging Conference, Santa Fe, NM, Nov. 1991.

(List continued on next page.)

*Primary Examiner*—Margaret R. Wambach
(74) *Attorney, Agent, or Firm*—DeWitt M. Morgan

(57) ABSTRACT

This invention relates to a method and apparatus for improving the precision of at least one of neutron coincidence counting and neutron multiplicity counting. The method includes the steps of: (1) sampling the real and accidental coincident pulses at the incoming pulse rate; and (b) sampling the accidental coincidences at a clock rate, wherein the clock rate is much faster than the pulse rate. The clock rate is faster than the pulse rate by a factor of 5 to 10 (in the preferred embodiment, approximately 4 MHz). The apparatus for improving the precision of neutron coincidence counting includes: (a) a shift register; (b) an up-down counter coupled to the shift register; (c) an R+A accumulator coupled to the up-down counter; (d) an A accumulator coupled to the up-down counter; (e) a strobe, the strobe coupled to the R+A accumulator but not to the A accumulator; (f) a clock, the clock coupled to the A accumulator but not to the R+A accumulator, the clock having a rate which is much faster than the pulse rate; and (g) apparatus for reconciling the independent counting of the A accumulator with that of the R+A accumulator. For improving the precision of multiplicity counting the apparatus includes an R+A multiplicity accumulator and an A multiplicity accumulator, The R+A multiplicity accumulator is connected to the up-down counter and the strobe, but not to the clock. The A multiplicity accumulator is coupled to the up-down counter and the clock, but not to the strobe. The clock rate is faster than the pulse rate by a factor of 5–10 (in the preferred embodiment, approximately, 4 MHz). The apparatus also includes apparatus for accumulating the total number of pulses, which is coupled to the strobe and the reconciling apparatus.

9 Claims, 15 Drawing Sheets

OTHER PUBLICATIONS

*Shift–Register Coincidence Electronics System for Thermal Neutron Counters*, James E. Swanson, et al., Los Alamos Informal Report No. LA–8319–MS, Apr. 1980.

*A 2–Fold Reduction in Measurement Time for Neutron Assay: Initial Tests of a Prototype Dual–Gated Shift Register (DGSR )*, J. E. Stewart, et al., Publication No. LA–UR–96–2462, presented at the 37th Annual Institute of Nuclear Materials Management Meeting, Naples, FL, Jul. 1996.

* cited by examiner

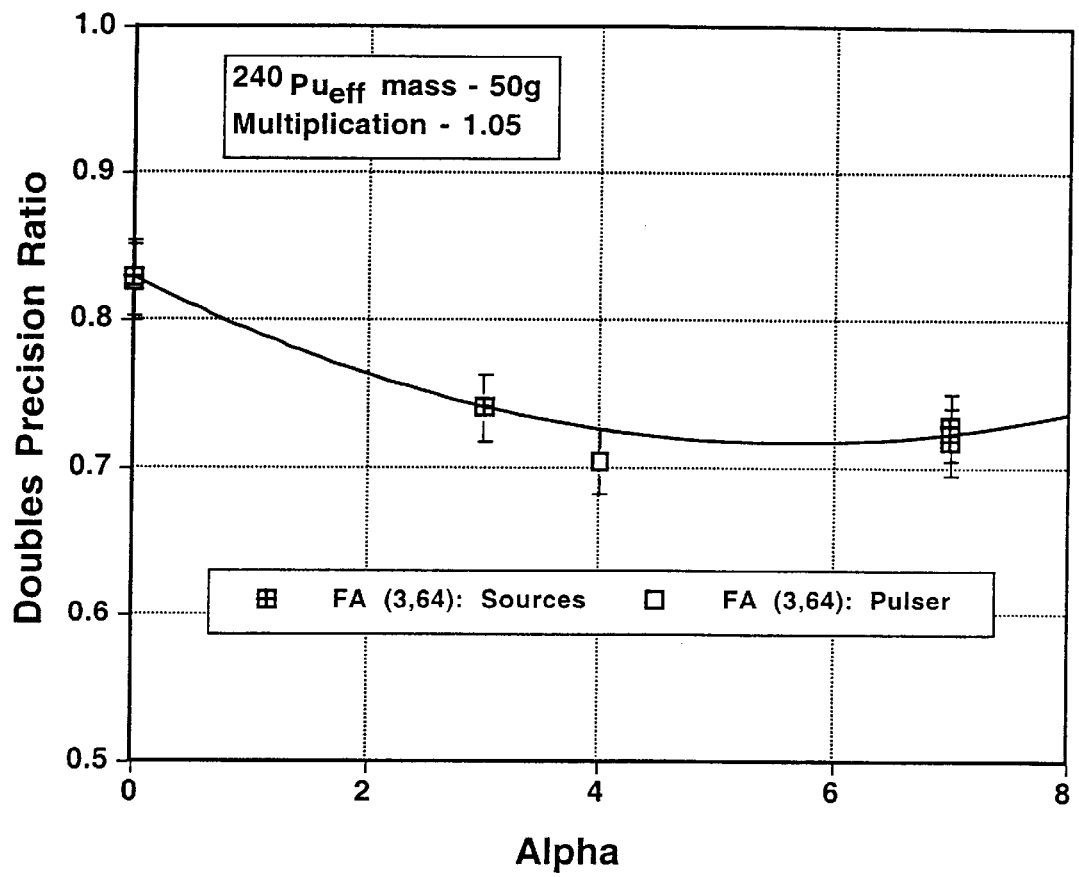
Figure 6. Relative precision of doubles (D) measurements for fast-accidentals (FA) sampling according to the present invention compared to a CMSR using Cf and AmLi sources and the pulser.

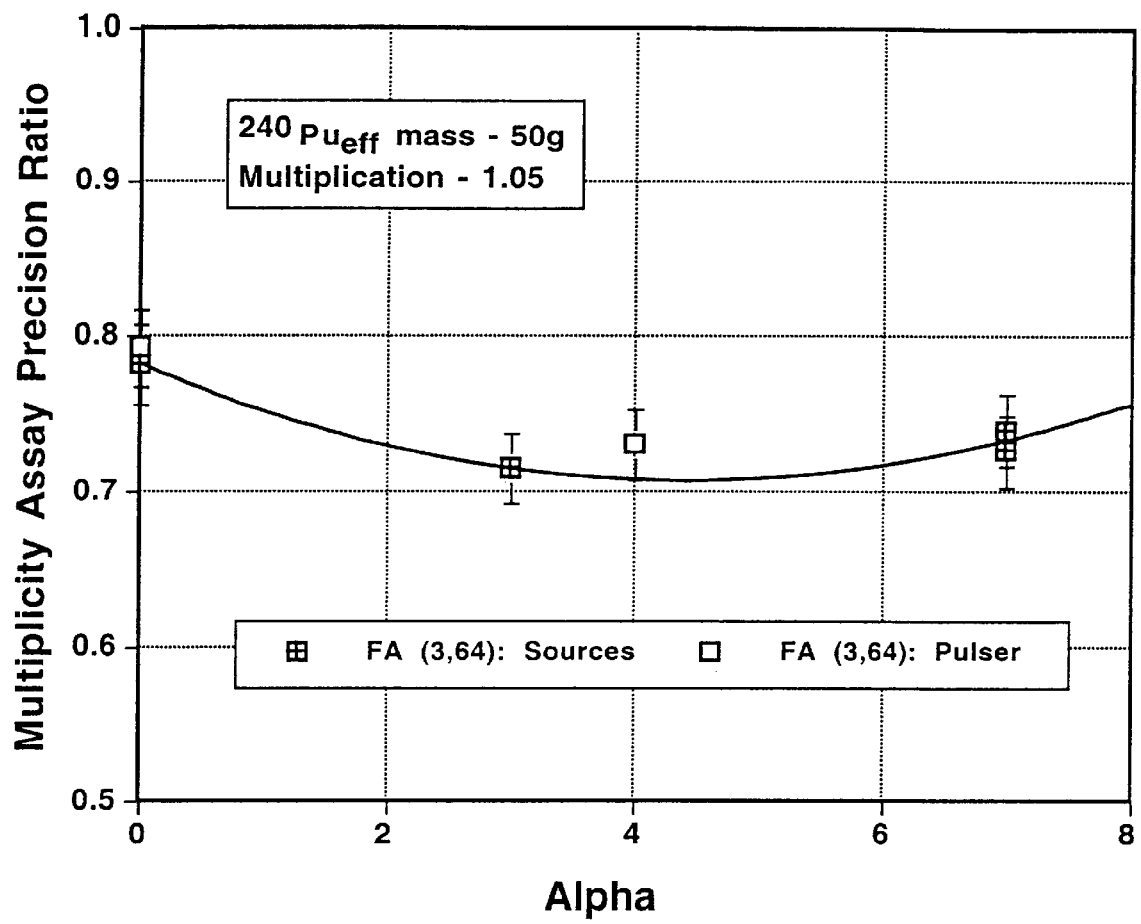
Figure 7. Relative precision of passive neutron multiplicity assays (PNMAs) for fast-accidentals (FA) sampling according to the present invention compared to a CMSR using Cf and AmLi sources and the pulser.

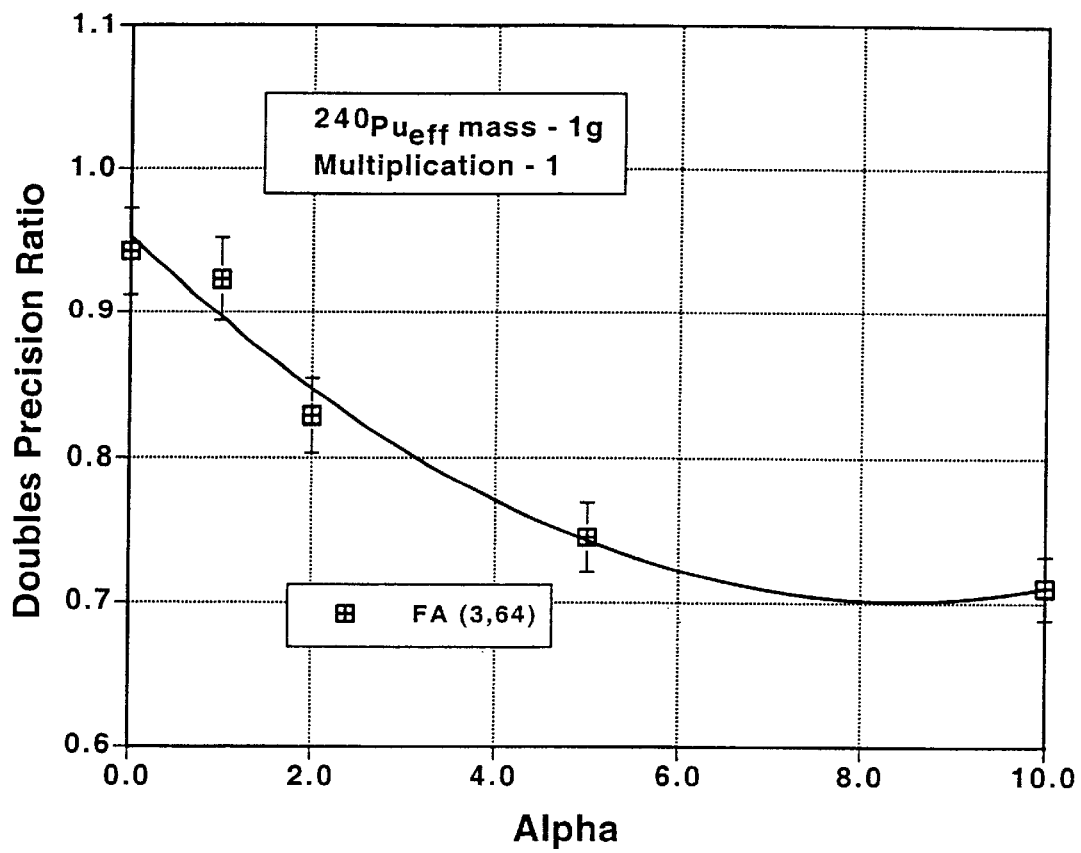
Figure 8. Relative precision of D measurements for FA sampling according to the present invention compared to a CMSR using the pulser to simulate small, variable -$\alpha$ items measured with TNMC detector parameters.

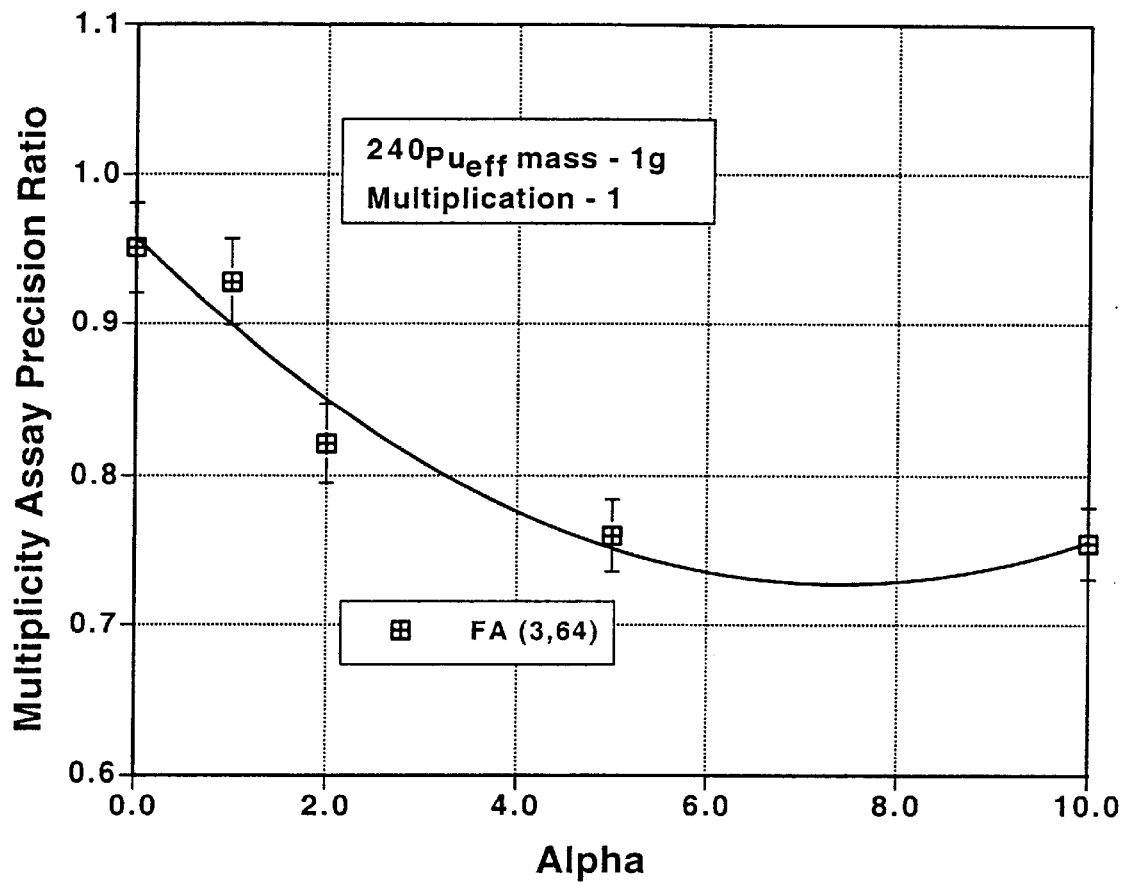
Figure 9. Relative precision of PNMA measurements for FA sampling according to the present invention compared to a CMSR using the pulser to simulate small, variables -$\alpha$ items measured with TNMC detector parameters.

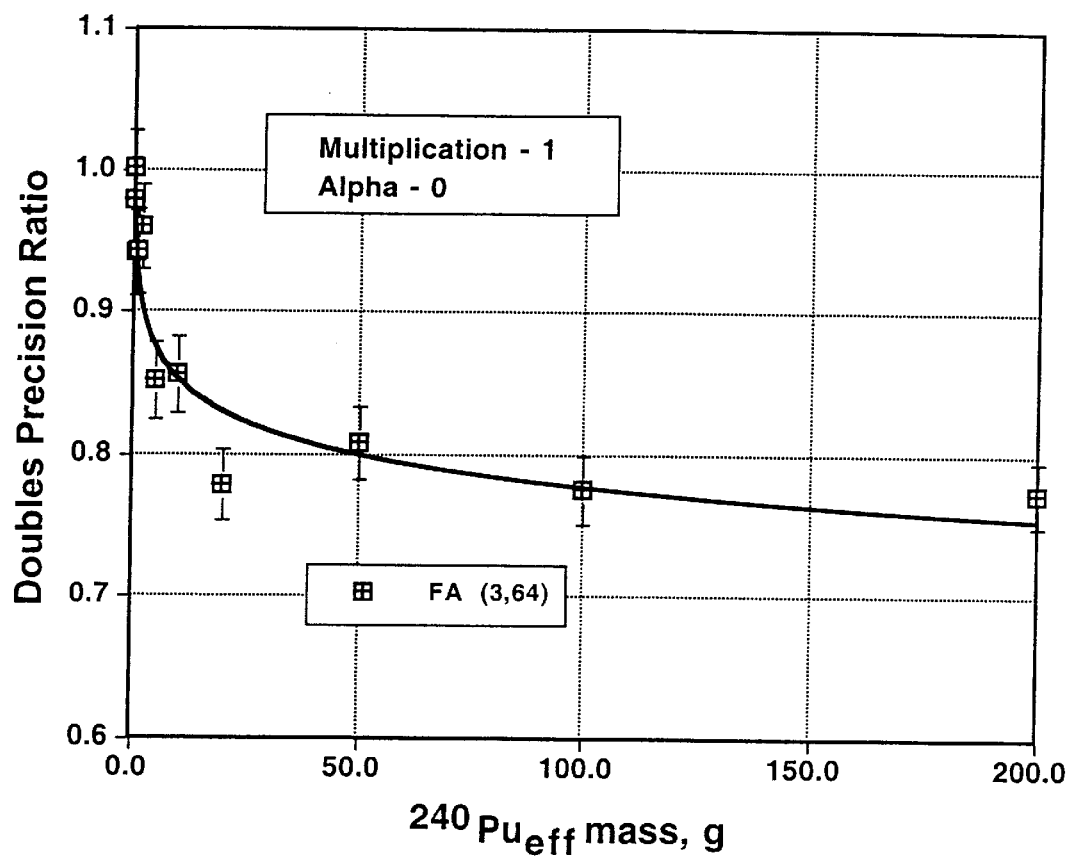
Figure 10. Relative precision of D measurements for FA sampling according to the present invention compared to a CMSR using the pulser to simulate $\alpha = 0$, variable-mass items measured with TNMC detector parameters.

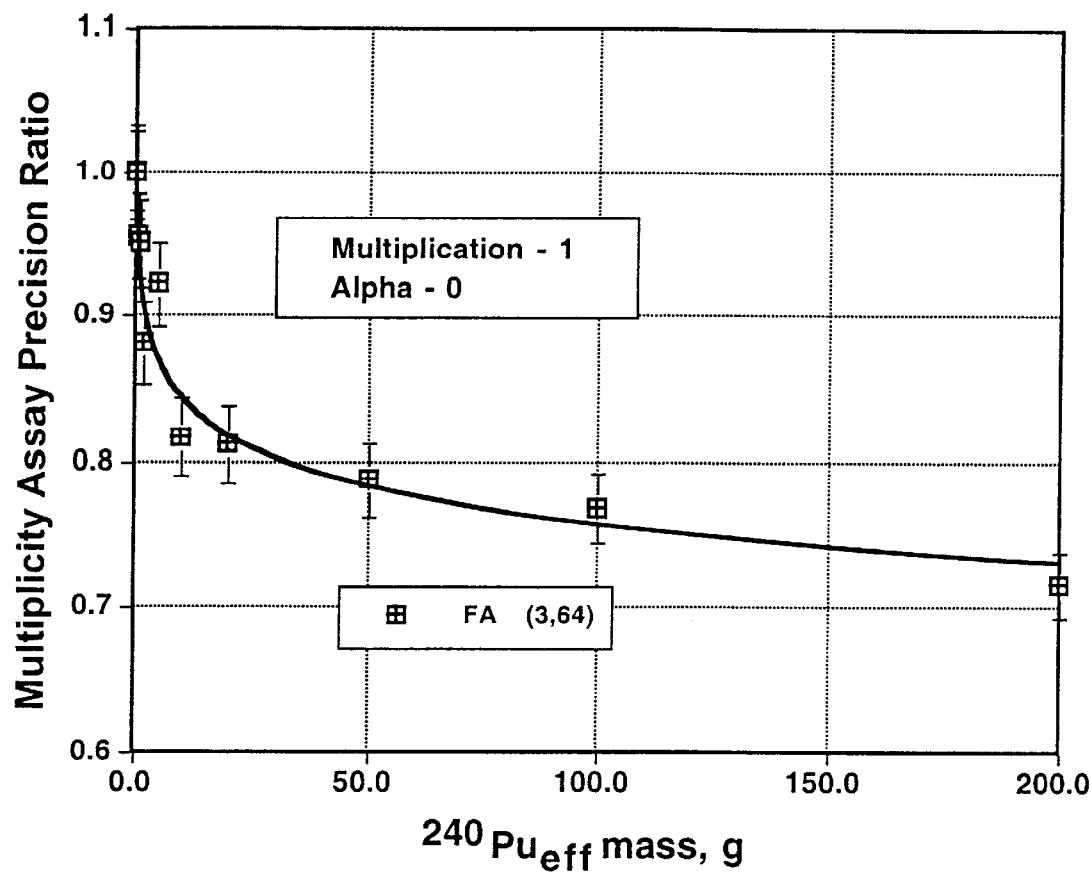
Figure 11. Relative precision of PNMA measurements for FA sampling according to the present invention compared to a CMSR using the pulser to simulate $\alpha = 0$, variable-mass items measured with TNMC detector parameters.

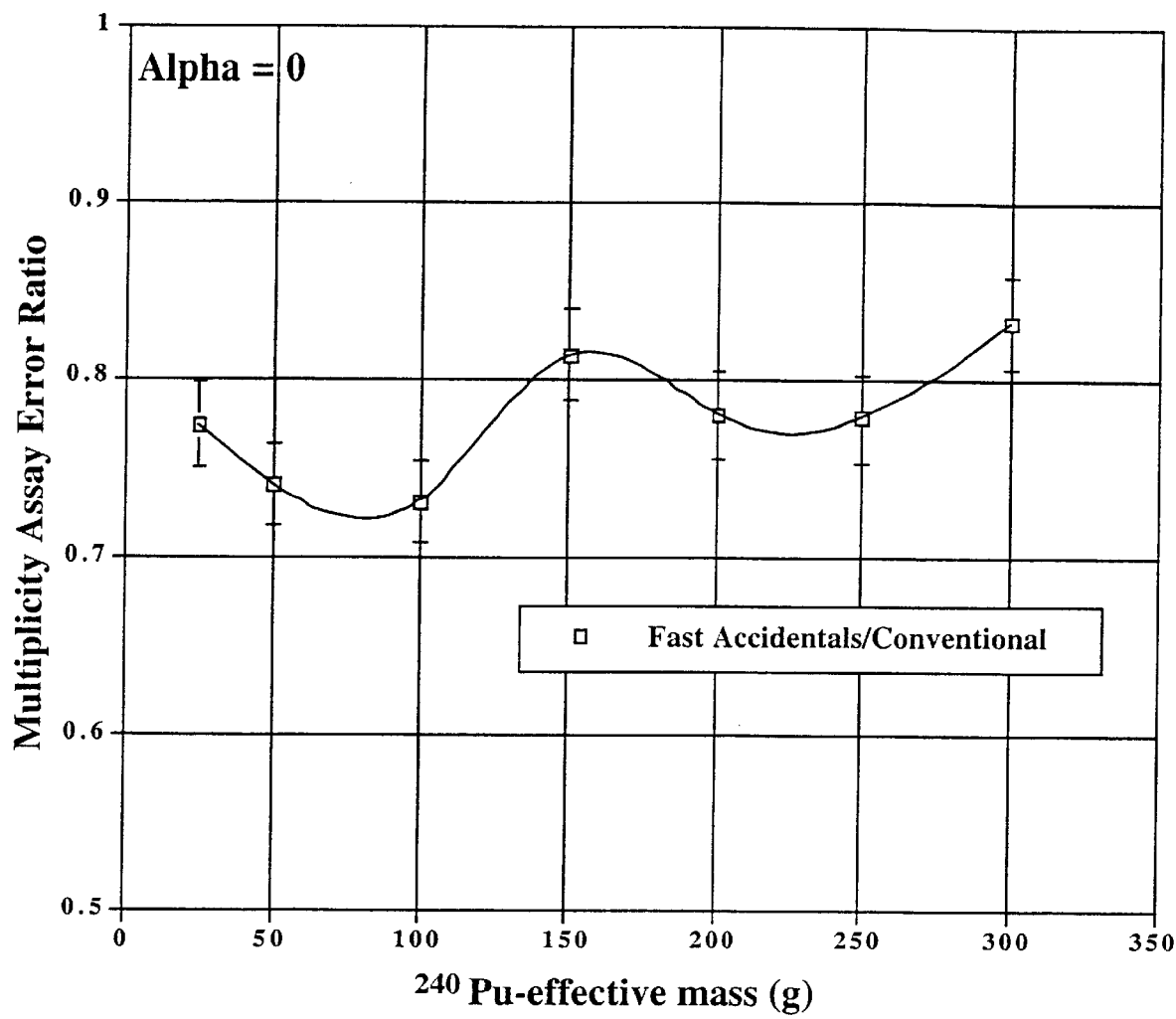
Figure 12. Relative precision of PNMA measurements for FA sampling (G = 64 µs) according to the present invention compared to a CMSR (G = 64 µs) using the pulser to simulate $\alpha = 0$, variable-mass items measured with TNMC detector parameters.

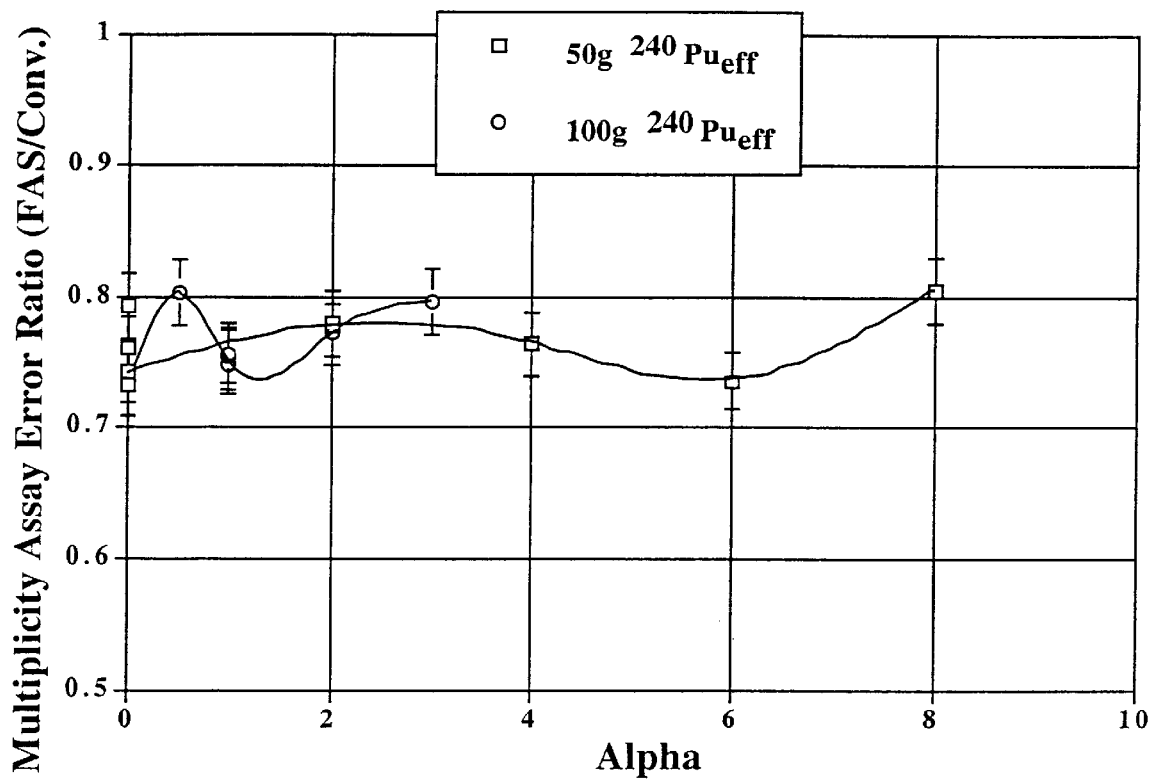
Figure 13. Relative precision of PNMA measurements for FA sampling (G = 64 μs) according to the present invention compared to a CMSR (G = 64 μs) using the pulser to simulate variable -α items with $^{240}Pu_{eff}$ masses of 50 and 100 g, measured with TNMC detector parameters.

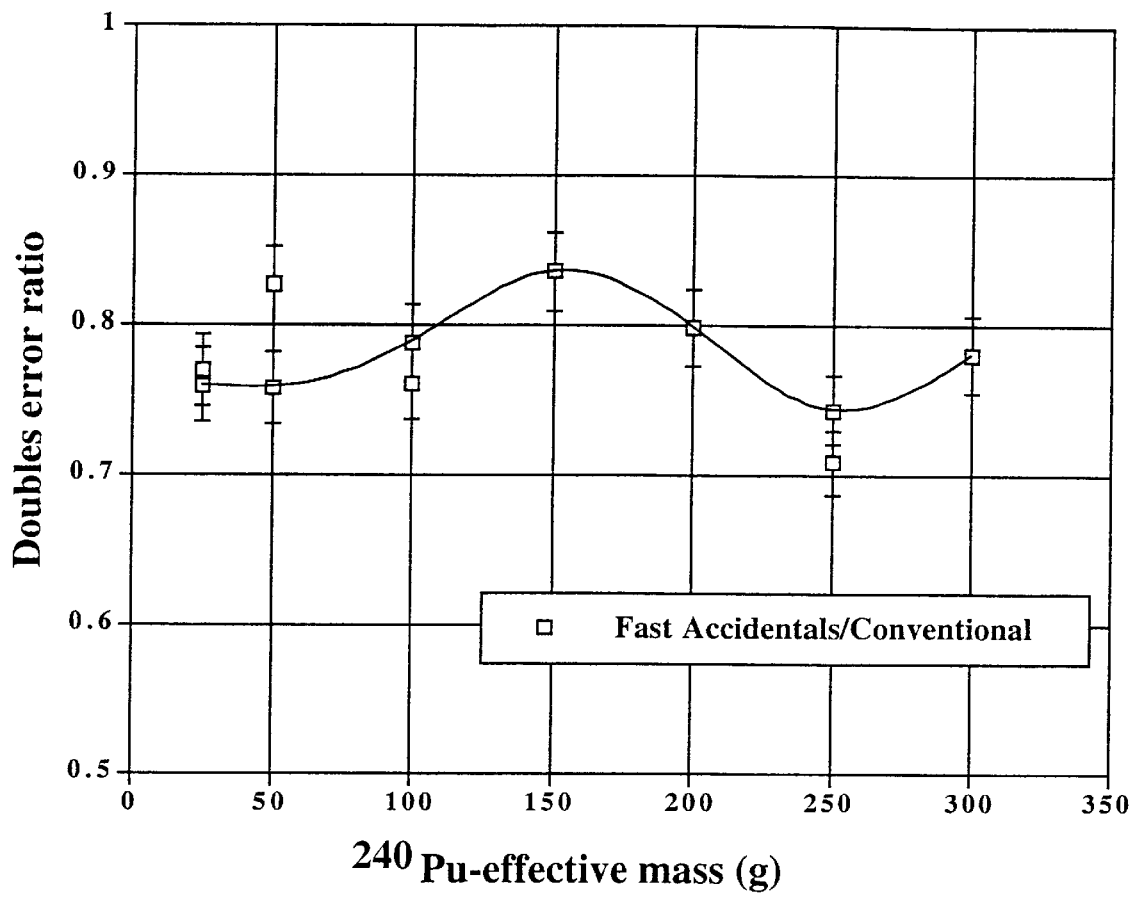
Figure 14. Relative precision of D measurements for FA sampling (G = 64 µs) according to the present invention compared to CMSR (G = 64 µs) using the pulser to siumulate $\alpha = 0$, variable-mass items measured with TNMC detector parameters.

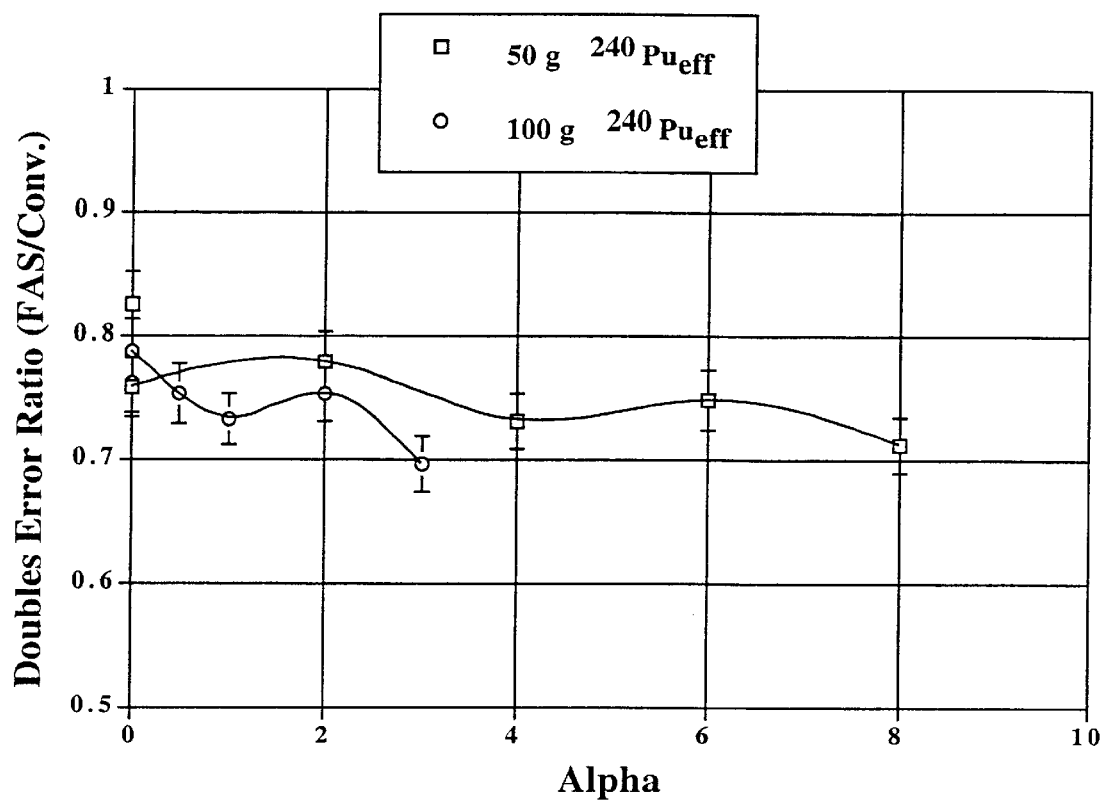
Figure 15. Relative precision of D measurements for FA sampling (G = 64 μs) according to the present invention compared to a CMSR (G = 64 μs) using the pulser to simulate variable -α items with $^{240}Pu_{eff}$ masses of 50 and 100 g, measured with TNMC detector parameters.

ADVANCED ELECTRONICS FOR FASTER TIME-CORRELATION ANALYSIS OF PULSE SEQUENCES

This Application claims benefit of Provisional Application Ser. No. 60/155,049 filed Sep. 21, 1999.

FIELD OF THE INVENTION

This invention relates to a method and apparatus for improving the precision of neutron coincidence and multiplicity assays of plutonium and uranium.

BACKGROUND

Neutron-coincidence counting ("NCC") is used routinely around the world for the non-destructive mass assay of uranium and plutonium in many forms. Passive neutron multiplicity counting ("PNMC") is used routinely for the nondestructive assay ("NDA") of plutonium scrap and waste. During the fission process multiple neutrons are emitted within a very short time frame, that is, in coincidence. The number of neutrons emitted in coincidence determines the multiplicity of the event.

For nondestructive analysis the sample in question is assayed by the detection of coincident fission neutrons from the spontaneous fission of, even-mass plutonium isotopes in the presence of a random neutron background (e.g., $(\alpha,n)$ reactions).

As is well known, $^3$He neutron detectors are much more efficient for detecting slow or thermal neutrons, compared to fast neutrons. When a thermal neutron collides with a $^3$He molecule, a voltage pulse is produced. FIG. 1 is a schematic illustrating this process, in which 11 is a gas tube having a casing 13 and an anode wire 15. Casing 13 is filled with $^3$He. Anode wire 15 is connected to source of high voltage 17 (e.g., 1700 volts), a capacitor 19 and a resistance 21, as is well known in the art. The ionization resulting from a thermal neutron colliding with a $^3$He molecule produces a voltage pulse, as is also illustrated in FIG. 1.

Neutrons originating from $(\alpha, n)$ reactions in the sample, from external sources, or different fissions are uncorrelated in time (i.e., random), whereas neutrons emitted by the same fissioning nucleus are time correlated. Typically, to distinguish correlated neutron events from random events (including neutrons from different fissions), two equal time periods are sampled by a coincidence circuit after a neutron has been detected. These circuits are also known as shift-register circuits. Los Alamos publication LA-UR-96-2462, "A 2-Fold Reduction in Measurement Time for Neutron Assay: Initial Tests of a Dual-Gated Shift Register (DGSR)" discloses unequal time periods, in which the R+A gate is 64 $\mu$s while the A gate is 1024 $\mu$s.

FIG. 2 is a neutron detection probability vs. time diagram depicting the operation of conventional shift register circuits. For a fission at time zero, the probability of detecting a fission neutron at time t decreases exponentially with time, namely:

$$P(t)=(1/\tau) \exp(-t/\tau) \qquad \text{(Eq. 1)}$$

Where $\tau$ is the neutron "die-away time." After a long delay, $\Delta$, the probability of detecting a neutron from a fission at t=0, is negligible. Therefore, upon detecting a neutron at time t, conventional shift register circuits count real coincidences R (neutron pulses from the same fission) plus accidental coincidences A (neutron pulses from other fissions plus time-random neutron pulses, e.g., from $(\alpha,n)$ reactions), in the time interval t+p to t+p+G, where G is the gate length, and p is the predelay. The predelay p removes bias due to electronic deadtime effects. Upon detecting a neutron at time t, conventional shift register circuits also count accidental coincidences A in the interval t+p+G+$\Delta$ to t+p+2G+$\Delta$ where $\Delta$ represents a long delay (e.g. 1 ms). At the end of the counting interval, one quantity of interest is the number of real coincidence pairs, or doubles (D), one NDA signature for fissile material mass. For doubles, the unfolding of R from R+A is simple:

$$D=(D+A_D)-(A_D) \qquad \text{(Eq. 2)}$$

Where D is the real doubles and $A_D$ is the accidental doubles. The statistical error in D (precision) is given approximately by:

$$\sigma_D=[(D+A_D)+A_D]^{1/2} \qquad \text{(Eq. 3)}$$

In most actual cases, D<<$A_D$, and the D error is approximately $$\sigma_D=(2A_D)^{1/2} \qquad \text{(Eq. 4)}$$

The error model in Equation 3 is based on the assumptions of independent errors in (D+$A_D$) and $A_D$ as well as Poisson statistics. Neither of these assumptions is valid for coincidence counting. However, this simple error model agrees with doubles sample-standard-deviation measurements to within a few tenths of a percent, depending on the item measured.

A conventional shift register circuit 111, which is illustrated in FIG. 3, includes a predelay 113, a shift register 115, an up-down counter 117, R+A accumulator (a/k/a sum) 119, A accumulator 121, R+A multiplicity accumulator 123, A multiplicity accumulator 125, and a strobe 127. In operation, a pulse entering shift register 115 increments (+1) up-down counter 117, while a pulse leaving shift register 115 decrements (−1) up-down counter 117. Thus, the number of pulses in shift register 115 is just the count in up-down counter 117. When a digital pulse 131 (a trigger pulse) crosses trigger point 133, strobe 127 is triggered. The contents of up-down counter 117 are added to R+A accumulator 119 and A accumulator 121, as well as R+A multiplicity accumulator 123 and A multiplicity accumulator 125, as indicated by strobe arrows 135, 137, 139 and 141. As those skilled in the art will appreciate, the strobe for accumulators 119 and 123 is simultaneous and occurs immediately upon a pulse crossing trigger 133, whereas the strobe for accumulators 121 and 125 which is also simultaneous is delayed by long delay 143 (e.g. 1 ms). The total number of trigger pulses is accumulated in totals register 145. Because a neutron pulse which enters the predelay 113 is produced at a later time than those neutron pulses already in shift register 115, the R+A accumulator actually tallies events which precede the neutron pulses which strobe the accumulators. This is functionally equivalent to the conceptual timing diagram of FIG. 2.

Precisions of neutron coincidence counting and neutron multiplicity counting are largely determined by the level of accidental coincidences pulses A. The higher A, the worse the precision. Thus, many neutron coincidence counting and neutron multiplicity counting assays are precision-limited, and require long count times for acceptable results. In the past, attempts to improve precision have been focused on detector design.

The article A New System for Analyzing Neutron Multiplicities: Characterization and Some Specific Applications, G. S. Brunson and G. J. Arnone, Los Alamos National Laboratories, LA-11701-MS (November, 1989), discusses decoupling the R+A and A accumulators. However, no purpose is mentioned for decoupling, and the disclosed circuit is not capable of the high sampling rates (e.g., 4 MHz) necessary for precision improvement. The circuit is limited to a pulse rate of 12.5 KHz and an A accumulator sampling rate of 125 KHz.

Accordingly, it is an object of the present invention to significantly improve neutron coincidence and neutron multiplicity counting precision by decoupling the sampling of the R+A gate from the A gate.

It is another object of the present invention to measure the R+A gate at the pulse rate, while measuring the A gate at a clock rate of 4 MHz, much faster (e.g., a factor of 5 to 10) than the pulse rate, thereby increasing the measurement precision of accidental coincidences. The greater the difference between the pulse rate and the clock rate, the greater the gain in precision of A. This, in turn, improves the precision of R, because R is obtained by unfolding R from R+A. Here, R, R+A, and A, can be either simple sums, in the case of conventional neutron coincidence counting, or pulse multiplicity distributions (0s, 1s, 2s, etc.) for neutron multiplicity counting.

It is a further object of the present invention to improve measurement precision, which permits, for a fixed precision, a significant reduction in measurement time.

It is a further object of the invention to reduce doubles measurement times by factors of 1.6 to 2.0 and to reduce passive neutron multiplicity assay times by factors of 1.7 to 2.1.

It is yet a further object to improve nuclear material assays for nonproliferation and international safeguards by the reduction of measurement times.

SUMMARY OF THE INVENTION

This invention relates to a method and apparatus for improving the precision of at least one of neutron coincidence counting and neutron multiplicity counting. The method includes the steps of: (a) sampling the real and accidental coincident pulses at the incoming pulse rate; and (b) sampling the accidental coincidences at a clock rate, wherein the clock rate is much faster than the pulse rate. The clock rate is faster than the pulse rate by a factor of 5 to 10 (in the preferred embodiment, approximately 4 MHz). The apparatus for improving the precision of neutron coincidence counting includes: (a) a shift register; (b) an up-down counter coupled to the shift register; (c) an R+A accumulator coupled to the up-down counter; (d) an A accumulator coupled to the up-down counter; (e) a strobe, the strobe coupled to the R+A accumulator but not to the A accumulator; (f) a clock, the clock coupled to the A accumulator but not to the R+A accumulator, the clock having a rate which is much faster than the pulse rate; and (g) apparatus for reconciling the independent counting of the A accumulator with that of the R+A accumulator. For improving the precision of multiplicity counting, the apparatus includes an R+A multiplicity accumulator and an A multiplicity accumulator. The R+A multiplicity accumulator is connected to the up-down counter and the strobe, but not to the clock. The A multiplicity accumulator is coupled to the up-down counter and the clock, but not to the strobe. The clock rate is faster than the pulse rate by a factor of 5–10 (in the preferred embodiment, approximately, 4 MHz). The apparatus also includes apparatus for accumulating the total number of pulses, which is coupled to the strobe and the reconciling apparatus.

BRIEF DESCRIPTION OF THE DRAWINGS

FIG. 6 shows the relative precision of doubles (D) measurements for FA sampling according to the present invention compared to a CMSR, using Cf+AmLi sources and the pulser (described in A Pulse Generator for Testing Shift-Register Coincidence Electronics, S. C. Bourret, M. S. Krick, and A. Romero, LA-UR-97-2763, presented at the Institute of Nuclear Materials Management, Phoenix, Ariz., Jul. 20–24, 1997, which disclosure is incorporated by reference) to simulate medium-sized plutonium items, with variable α, measured with a 5RMC (5 Ring Multiplicity Counter) and the pulser, respectively, wherein the pulser measurements used typical thermal neutron multiplicity counter ("TNMC") detector parameters;

FIG. 7 shows the relative precision of passive neutron multiplicity assays (PNMAs) for FA sampling according to the present invention compared to a CMSR, using Cf+AmLi sources and the above referenced pulser to simulate medium-sized plutonium items, with variable-α measured with the 5RMC and the pulser (TNMC) detector parameters, respectively;

FIG. 8 shows the relative precision of doubles (D) measurements for FA sampling according to the present invention compared to a CMSR using the above referenced pulser to simulate small, variable a plutonium items measured with TNMC detector parameters;

FIG. 9 shows the relative precision of passive, neutron multiplicity assays (PNMAs) for FA sampling according to the present invention compared to a CMSR, using the pulser to simulate small, variable a plutonium items measured with TNMC detector parameters;

FIG. 10 shows the relative precision of doubles (D) measurements for FA sampling according to the present invention compared to a CMSR, using the pulser to simulate variable mass plutonium items measured with TNMC detector parameters;

FIG. 11 shows the relative precision of passive neutron multiplicity assays (PNMAs) for FA sampling according to the present invention compared to a CMSR, using the pulser to simulate variable-mass plutonium items measured with TNMC detector parameters;

FIG. 12 shows the relative precision of passive neutron multiplicity assays (PNMAs) for FA (3,64) sampling according to the present invention compared to a CMSR, versus Pu-240 effective mass, for α=0;

FIG. 13 shows the relative precision of passive neutron multiplicity assays (PNMAs) for FA (3,64) sampling according to the present invention compared to a CMSR, versus α, for Pu-240 effective masses of 50 and 100 grams;

FIG. 14 shows the relative precision of doubles (D) measurements for FA sampling according to the present invention compared to a CMSR versus Pu-240 effective mass, for α=0; and FIG. 15 shows the relative precision of doubles (D) measurements for FA sampling according to the present invention compared to a CMSR, versus α, for Pu-240 effective masses of 50 and 100 grams.

DESCRIPTION OF THE PREFERRED EMBODIMENT

Figure 1:
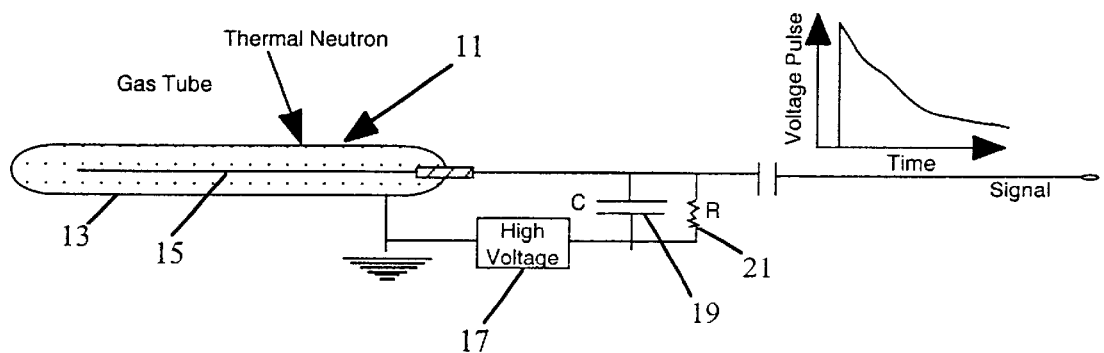
FIG. 1 is a schematic of a conventional thermal neutron detector and a voltage pulse produced by the ionization of a thermal neutron colliding with a $^3$He molecule.
Figure 2:
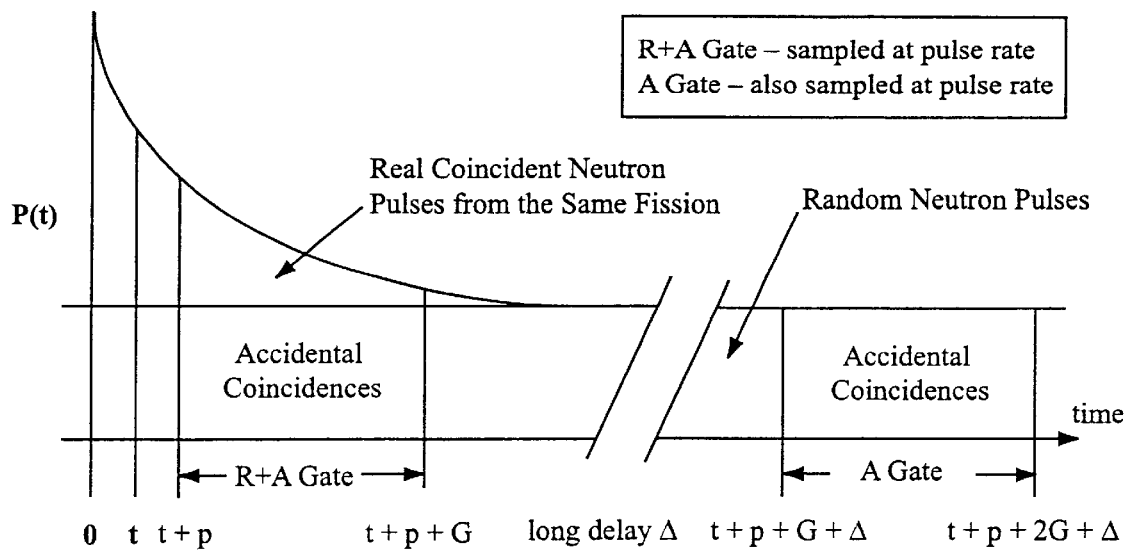
FIG. 2 is a neutron detection probability versus time diagram for a conventional multiplicity shift register ("CMSR") circuit.
Figure 3:
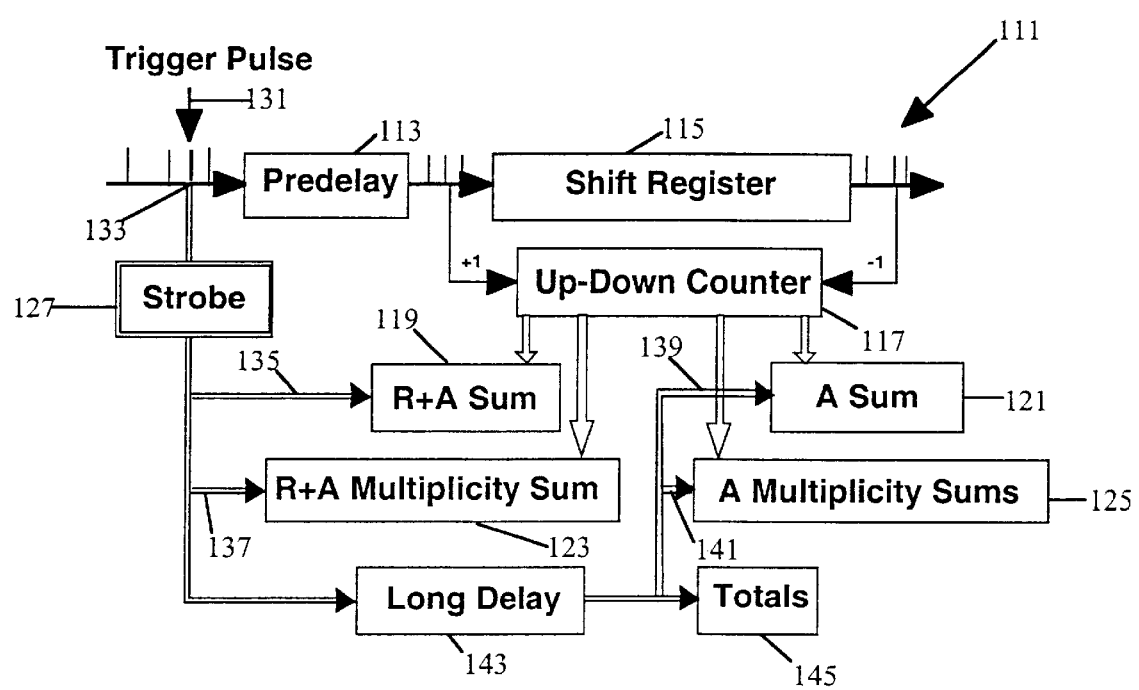
FIG. 3 is a block diagram of a conventional shift register circuit for coincidence and multiplicity counting of digital neutron pulses.
Figure 4:
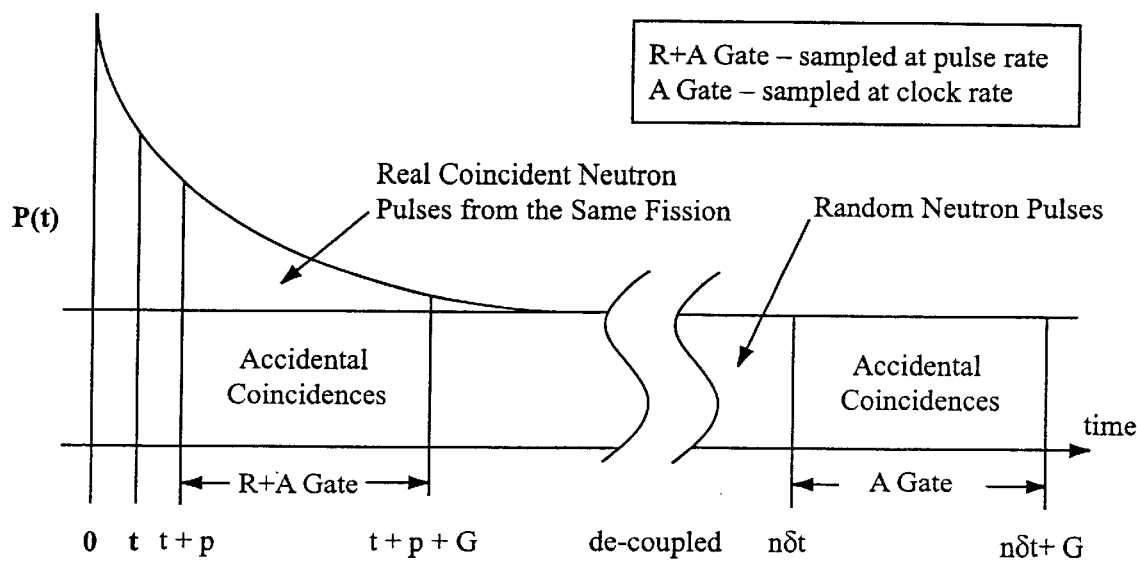
FIG. 4 is a neutron detection probability versus time diagram depicting the operation of the shift register circuit of the present invention for both coincidence and multiplicity counting.

In the preferred embodiment of the present invention the R+A gate is sampled conventionally, at the pulse rate. However, the A gate is sampled at the clock rate. With reference to FIG. 4, n is the clock cycle rate, and δt is the time increment per cycle, in the preferred embodiment, 0.25 µs. Sampling of the 2 gates is decoupled, compared with the conventional approach. As the clock rate (4 MHz here) is usually very much larger than the pulse rate (e.g., by a factor of 10), measurement precision of accidental coincidences is very much better than that of signal-triggered real-plus-accidental coincidences. This results in a decrease of $\sigma_D$ by a factor of, approximately, $2^{1/2}$, or $$\sigma_{D-FA} \sim A_D^{1/2} \qquad \text{(Eq. 5)}$$

Where FA stands for Fast-Accidentals, according to the present invention. D, measured by conventional multiplicity shift-register (CMSR) circuits, is the number of pulse-triggered time-correlated pairs ("doubles") in a counting interval. Because measurement time is inversely proportional to the square of precision, the resultant reduction in doubles measurement time to reach a fixed precision is a factor of 2, according to the simple error model.

CMSRs accumulate all multiplets of neutron pulses (0s, 1s, 2s, 3s, etc.) separately from the R+A and A gates. The R+A and A pulse multiplicity distributions are unfolded to produce the R multiplicity distribution. Moments of the R distribution are formed that can yield the rates of double, triple, quad, etc., real coincidences. In practice, the doubles rate is usually determined by simply summing the pulse-triggered contents of the R+A and A gates, subtracting the two, and dividing by the count time. The triples rate is determined by an equation involving moments of the R+A and A distributions. Exact, analytic, and point-model equations have been developed for the singles, doubles and triples rates. These equations contain detector parameters, nuclear fission data, and assay-sample unknowns. For a plutonium item, the unknowns are the neutron source intensities from spontaneous fission (SF), induced fission (IF) and (α,n) reactions. The SF rate is directly related to the effective mass of $^{240}$Pu in the item, the assay quantity of interest. Exact expressions for the multiplicity assay mass precision have not yet been developed, but theoretical/empirical estimates are available for CMSRs.

Figure 5:
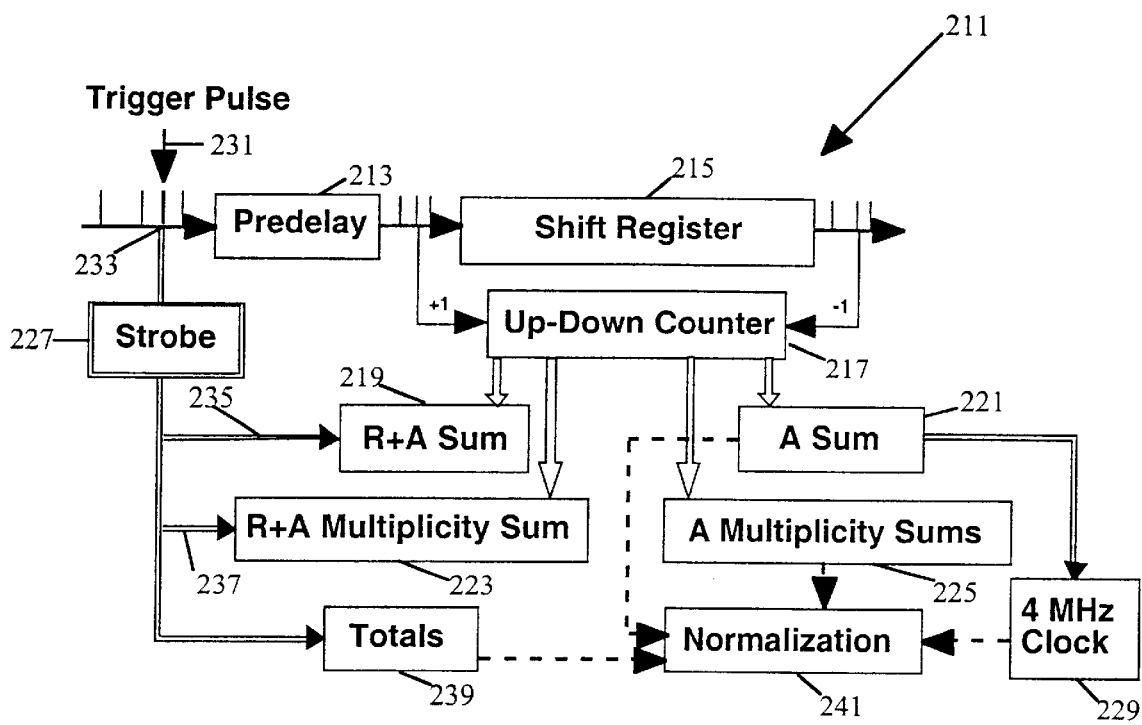
FIG. 5 is a block diagram of the fast-accidentals ("FA") shift register circuit for coincidence and multiplicity counting of digital neutron pulses of the present invention.

FIG. 5 is a block diagram of the fast accidentals sampling shift-register of the present invention. Circuit 211 includes a predelay 213, a shift register 215, an up-down counter 217, R+A accumulator 219, A accumulator 221, R+A multiplicity accumulator 223, A multiplicity accumulator 225, strobe 227 and clock 229. As with conventional shift registers, a pulse entering shift register 215 increments (+1) up-down counter 217, while a pulse leaving shift register 215 decrements (−1) up-down counter 217. Thus, the number of pulses in shift register 215 is just the count in up-down counter 217. The contents of up-down counter 217 are added to R+A accumulator 219 and the R+A multiplicity accumulator 223 for each trigger pulse as indicated by strobe arrows 235 and 237. In operation when a digital pulse 231 (a trigger pulse) crosses trigger point 233, strobe 227 is triggered. As those skilled in the art will appreciate, the strobe for accumulators 219 and 223 occurs immediately upon a pulse crossing trigger point 233. However, independent of strobe 227, the contents of up-down counter 217 are added to A accumulator 221 and the A multiplicity accumulator 225 at the clock rate of 4 MHz. The total number of pulses is accumulated in register 239. The A sum and the R+A sums are normalized in circuit 241. Normalization reconciles the A accumulator with the R+A accumulator, and reconciles the A multiplicity accumulator with the R+A multiplicity accumulator. Normalization is necessary because the A registers 221 and 223 are sampled at a much faster rate than the R+A registers 219 and 223. To permit the unfolding of R from R+A, all four accumulators ultimately have to be based on the same sampling rate.

Using both the above described time-correlated pulser and neutron sources, PNMC (passive neutron multiplicity counting) assays (PNMAs) were simulated for a wide variety of plutonium samples. $^{240}$Pu-effective masses ranged from 0.1 to 200 g. The important parameter α (ratio of (α,n) to spontaneous-fission neutrons) varied from 0 to 10. Fast Accidental sampling or FA according to the present invention was also tested on Pu-oxide standards. For sources and standards measurements, representative of the majority of NCC and PNMC applications, FA precision reductions relative to conventional multiplicity shift-register (CMSR) circuits, are 20–29% for doubles, and 24–31% for multiplicity assays. For $^{240}$Pu-effective masses of 50–100 g, FA gains are roughly independent of α. For α=0, FA gains are roughly independent of $^{240}$Pu-effective mass. FA sampling has been implemented in the advanced multiplicity shift register described above. Because measurement time is inversely proportional to the square of precision, the present invention, relative to CMSRs, reduces doubles measurement times by factors of 1.6 to 2.0. The reduction for PNMC assays is by factors of 1.7 to 2.1. Testing of FA sampling on plutonium was done using an integrated system: the Epithermal Neutron Multiplicity Counter (ENMC), the commercial AMSR-150, and the general-purpose international NCC software package, INCC v. 4.00. FA sampling also significantly improves measurement precision for active NCC assays of uranium. The new electronics reduces the need for high efficiency and, therefore, the cost of neutron coincidence and multiplicity counters.

An extensive series of measurements was performed using the time-correlated/random pulser referenced above to simulate actual measurements of a wide range of plutonium items in a simulated, typical thermal neutron multiplicity counter (TNMC). The assumed TNMC has an efficiency of 50%, and a die-away time of 50 µs. A CMSR used with the TNMC is normally set with a predelay of 3 µs, and a gate of 64 µs. Several pulse-sampling cases were tested for each item, using an experimental AMSR. Two of these cases are described in Table I.

TABLE I

General Description of Pulse-Sampling Methods: Pulser-Simulated TNMC Measurements

| Case | Pulse-Sampling method | Description | Predelay, p µs | Gate, G µs | Doubles gate fraction, $f_D$ | Triples gate fraction, $f_T$ |
|---|---|---|---|---|---|---|
| A | Conventional | C (3, 64) | 3 | 64 | 0.6799 | 0.4623 |
| B | Fast Accidentals | FA (3, 64) | 3 | 64 | 0.6799 | 0.4623 |

We also tested pulse sampling methods using combinations of AmLi and $^{252}$Cf neutron sources, measured with the 5 Ring Multiplicity Counter ("5RMC"). The 5RMC has an efficiency of 54%, and a die-away time of 55 μs, similar to a TNMC. Both types of tests (sources and pulser) produced time-correlated and random pulse streams characteristic of real plutonium items. For each measurement, 1000 repeat cycles were acquired, and standard deviations of the means of measured parameters were determined. For 1000 repeats, the relative error in the standard deviation of the mean is $2000^{-\frac{1}{2}}$, or 2.24%.

For FA(3,64) sampling in Table I, FIG. 6 shows the ratio of measured D precisions according to the present invention relative to those for the conventional method. For this case, the pulser was programmed to simulate medium-sized plutonium items with a $^{240}$Pu$_{\it eff}$ mass (m) of 50 g, a multiplication (M) of 1.05, and 2 values of α, 0 and 4. TNMC detector parameters were used. Results of this case are plotted with results of 5RMC measurements using combinations of $^{252}$Cf and AmLi sources, approximating m and M programmed for the pulser, with α ranging from 0 to ~7. The pulser results are in good agreement with the sources results. FIG. 6 shows the FA(3,64) D precision ratios of 0.8 for α=0, to 0.72 for αs greater than 4. Here, FA(3,64) means FA with p=3 μs, and G=64 μs. FIG. 6 shows D precision ratios to be only weakly dependent on α for the 50-g item.

FIG. 7 is similar to FIG. 6 for PNMA precision ratios. As with FIG. 6, results are shown for 5RMC sources and TNMC pulser measurements. The pulser results are not in good agreement with the sources results, probably due to the greater sensitivity of PNMAs (relative to doubles) and to small differences in detector and item parameters between 5RMC sources and TNMC pulser measurements. FIG. 7 shows the FA(3,64) PNMA precision ratios of 0.77 for α=0, to between 0.70 and 0.76 for α greater than 4. FIG. 7 shows PNMA precision ratios to be only weakly dependent on α for the 50-g item. FIG. 8 is similar to FIG. 6 for smaller mass and multiplication. The pulser was programmed to simulate small plutonium items with a $^{240}$Pu$_{\it eff}$ mass (m) of 1 g, a multiplication (M) of 1, and 5 values of α; 0, 1, 2, 5, and 10. TNMC detector parameters were again used. FIG. 8 shows FA(3,64) D precision ratios of 0.92 for α=0, to 0.72 for α greater than 6. FIG. 8 shows FA(3,64) D precision ratios to be strongly dependent on α for the 1-g item, for α less than 5.

FIG. 9 is similar to FIG. 8 for PNMA precision ratios. The pulser was programmed to simulate small plutonium items with a $^{240}$Pu$_{\it eff}$ mass (m) of 1 g, a multiplication (M) of 1, and 5 values of α; 0, 1, 2, 5, and 10. TNMC detector parameters were again used. FIG. 9 shows PNMA precision ratios of 0.93 for α=0, to 0.71 for α greater than 6. FIG. 9 shows the PNMA precision ratios to be strongly dependent on α for the 1-g item, for α less than 5.

For FA(3,64) sampling in Table I, FIG. 10 shows the ratio of measured D precisions according to the present invention relative to those for the conventional method. For this case, the pulser was programmed to simulate plutonium items with a multiplication (M) of 1, α=0, and variable $^{240}$Pu$_{\it eff}$ mass (m=0.1, 0.2, 0.5, 1, 2, 5, 10, 20, 50, 100 and 200 g). TNMC detector parameters were used. FA(3,64) D precision ratios range from unity for zero $^{240}$Pu$_{\it eff}$ mass to ~0.76 for 200 g $^{240}$Pu$_{\it eff}$.

FIG. 11 is similar to FIG. 10 for PNMA precision ratios. FA(3,64) PNMA precision ratios range from unity for zero $^{240}$Pu$_{\it eff}$ mass to ~0.75 for 200 g $^{240}$Pu$_{\it eff}$. FA (3,64) PNMA precision ratios range from unity for zero $^{240}$Pu$_{\it eff}$ mass to ~0.73 for 200 g $^{240}$Pu$_{\it eff}$.

A commercial AMSR 150 was modified to include FA sampling. At the same time, a version of the INCC code, compatible with FA sampling, became available. We integrated these components to make the ENMC/AMSR/INCC system.

Table II (below) gives measurement-precision performance comparisons of the AMSR (FA sampling) and CMSR for four plutonium oxide standards spanning a range of Pu mass, %240Pu$_{\it eff}$, multiplication, and α. Note that standard LAO252C10 is very similar to an item in FIGS. 6 and 7, with an α of 0.5. The ENMC/AMSR/INCC system was used for these measurements.

The results of Table II show significant precision and/or count time improvements for all but the smallest standard, CBNM Pu61. FA sampling is not effective for samples with low-accidental coincidence rates. However, for measurements of very small masses (e.g., in large waste containers) real coincidence rates can be dominated by accidentals from background neutrons. In this case, FA sampling could show a substantial benefit.

TABLE II

Comparison of Precisions and Count Times for ENMC/AMSR and ENMC/CMSR Measurements of Standards

| | | Standard ID | | | |
|---|---|---|---|---|---|
| | Standard Parameter | LAO252C10 | STDSRP12-1 | STD-11 | CBNM Pu61 |
| | Pu, g | 319.6 | 874.3 | 59.81 | 5.556 |
| | $^{240}$Pu$_{\rm eff}$, g | 54.3 | 108.4 | 4.58 | 2.02 |
| | Multiplication | 1.045 | 1.117 | 1.004 | 1.026 |
| | α | 0.499 | 1.039 | 4.852 | 0.985 |
| Multiplicity Shift Register | | | | | |
| Advanced (AMSR) | Cycle Time | 30 | 50 | 30 | 20 |
| | Cycles | 996 | 965 | 998 | 997 |
| | Doubles | 15793.1 | 47869.9 | 1138.6 | 552.65 |
| | Doubles precision | 2.842 | 6.478 | 0.649 | 0.324 |
| | PNM Assay - Pu, g | 319.1 | 873.6 | 59.57 | 5.547 |
| | Assay precision | 0.144 | 0.543 | 0.116 | 0.00456 |
| Conventional (CMSR) | Cycle Time | 100 | 60 | 100 | 20 |
| | Cycles | 120 | 95 | 466 | 998 |
| | Doubles | 16250.7 | 48588.0 | 1146.9 | 551.67 |
| | Doubles precision | 5.588 | 24.89 | 0.651 | 0.334 |
| | PNM Assay - Pu, g | 318.0 | 874.2 | 59.92 | 5.536 |
| | Assay precision | 0.300 | 2.111 | 0.128 | 0.00467 |
| AMSR/CMSR Precision Ratios: | Doubles | 0.826 ± 0.056 | 0.769 ± 0.058 | 0.805 ± 0.032 | 0.968 ± 0.031 |
| | Multiplicity Assay | 0.765 ± 0.052 | 0.754 ± 0.057 | 0.731 ± 0.029 | 0.978 ± 0.031 |

TABLE II-continued

Comparison of Precisions and Count Times for ENMC/AMSR and ENMC/CMSR Measurements of Standards

|  |  | Standard ID | | | |
|---|---|---|---|---|---|
|  | Standard Parameter | LAO252C10 | STDSRP12-1 | STD-11 | CBNM Pu61 |
| 1000 s Counts CMSR/AMSR | Doubles | 1.466 ± 0.113 | 1.693 ± 0.117 | 1.543 ± 0.064 | 1.068 ± 0.061 |
| Count Time Ratios: Fixed Precision | Multiplicity Assay | 1.710 ± 0.234 | 1.758 ± 0.267 | 1.873 ± 0.149 | 1.046 ± 0.066 |

For the three largest standards (LAO261C10, STDSRP12-1, and STD-11), gains from FA sampling are greater for passive neutron multiplicity assay (PNMA) than doubles (D). This is because multiplicity assays are based on measurements of the singles, doubles and triples. FA gains for PNMA precision result from a combination of FA gains for doubles (D) and triples (T) precisions.

Table II also shows that FA gains are greatest for STD-11, with a Pu mass of only 60 g, but with an α of 4.9. For the first 2 standards, the FA gains are slightly greater for the higher mass and α. In general, the measured gains in count times are lower than a factor of two, estimated only approximately by the simple error model described above. Note that the LAO252C10 FA precision ratios are in excellent agreement with FIGS. 6 and 7.

FIGS. 12 and 13 show FA pulser testing results for neutron multiplicity assay precision. FIG. 12 shows little variation in the multiplicity error ratio (FAS/Conventional) versus $^{240}$Pu-effective mass, for α=0. The average FA ratio is 0.774. The inverse square of the error ratio is the measurement time reduction factor 1.7. AmLi/Cf sources measurements gave similar, but slightly lower FA error ratios for a factor of 1.8 count time reduction. FIG. 13 shows little variation in the relative multiplicity assay precision ratio of FA versus α for fixed a $^{240}$Pu-effective masses (50 and 100 g). The average FA ratio is 0.764. The inverse square of the error ratio is the measurement time reduction factor 1.7. AmLi/Cf sources measurements gave similar, but slightly lower FA error ratios for a factor of 1.8 count time reduction.

FIGS. 14 and 15 show FA pulser testing results for doubles precision. FIG. 14 shows little variation in the FA doubles error ratio versus $^{240}$Pu-effective mass, for α=0. The average FA ratio is 0.775. The inverse square of the error ratio is the measurement time reduction factor 1.76. AmLi/Cf sources measurements gave similar, but slightly lower FA error ratios for a factor of 1.8 count time reduction. FIG. 15 shows little variation in the FA double error ratio versus α for fixed $^{240}$Pu-effective masses. The average ratio for FA is 0.753. The inverse square of the error ratio is the measurement time reduction factor 1.8. AmLi/Cf sources measurements gave quite similar results.

Most testing of the new methods has been done using the pulser. The pulser produces only an approximation to the real pulse stream, in that it produces multiplicities of 1, 2, and 3, 4 but none higher. In limited comparisons we've made for pulser-simulated samples, the results of actual measurements using $^{252}$Cf and AmLi sources and plutonium oxide standards are in good agreement for FA. However, for high values of $^{240}$Pu-effective masses (m), multiplication(M), and/or α, we have observed biases.

In summary, using the pulser and neutron sources, we've simulated PNMC assays (PNMAS) for a wide variety of plutonium samples. $^{240}$Pu-effective masses ranged from 0.1 to 200 g. The important parameter α varied from 0 to 10. We've also tested FA sampling on Pu-oxide standards. For sources and standards measurements, representative of the majority of in-facility NCC and NMC applications, FA precision reductions relative to conventional multiplicity shift-register (CMSR) circuits, are 20–29% for doubles, and 24–31% for multiplicity assays. For $^{240}$Pu-effective masses of 50–100 g, FA gains are roughly independent of α. For α=0, FA gains are roughly independent of $^{240}$Pu-effective mass. FA sampling has been implemented in the Advanced Multiplicity Shift Register (AMSR). The AMSR, relative to CMSRs, reduces doubles measurement times by factors of 1.6 to 2.0. The reduction for PNMA is by factors of 1.7 to 2.1. Testing of FA sampling on plutonium was done with an integrated system: the Epithermal Neutron Multiplicity Counter (ENMC), the commercial AMSR-150, and the general-purpose international NCC software package, INCC v. 4.00.

FA sampling also significantly improves measurement time (by a factor of ~2) for active NCC assays of uranium. The new electronics reduces the need for high efficiency, and therefore cost, of neutron coincidence and multiplicity counters.

While the present invention has been depicted, described, and is defined by reference to particularly preferred embodiments, such references do not imply a limitation on the invention, and no such limitation is to be inferred. The invention is capable of modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the scope of the appended claims.

We claim:

1. Apparatus for improving the precision of neutron coincidence counting, said apparatus comprising:
   a. a shift register;
   b. an up-down counter coupled to said shift register;
   c. an R+A accumulator coupled to said up-down counter;
   d. an A accumulator coupled to said up-down counter;
   e. a strobe, said strobe coupled to said R+A accumulator but not to said A accumulator;
   f. a clock, said clock coupled to said A accumulator but not to said R+A accumulator, said clock having a rate which is much faster than the pulse rate; and
   g. means for reconciling the independent counting of said A accumulator with said R+A accumulator.

2. The apparatus of claim 1, further including an R+A multiplicity accumulator and an A multiplicity accumulator, said R+A multiplicity accumulator being connected to said up-down counter and said strobe means but not to said clock, said A multiplicity accumulator being coupled to said up-down counter and said clock but not to said strobe, whereby precision of the neutron multiplicity counting is improved.

3. The apparatus of claim 1, wherein said clock rate is faster than said pulse rate by a factor of 5–10.

4. The apparatus of claim 1, wherein said clock rate is, approximately, 4 MHz.

5. The apparatus of claim 1, further including means for accumulating the total number of pulses, said means for accumulating coupled to said strobe and said means for reconciling.

6. Apparatus for improving the precision of multiplicity counting, said apparatus comprising:
   a. a shift register;
   b. an up-down counter coupled to said shift register;
   c. an R+A multiplicity accumulator coupled to said up-down counter;
   d. an A multiplicity accumulator coupled to said up-down counter;
   e. a strobe, said strobe coupled to said R+A multiplicity accumulator but not to said A multiplicity accumulator;
   f. a clock, said clock coupled to said A multiplicity accumulator but not to said R+A accumulator, said clock having a rate which is much faster than the pulse rate; and
   g. means for reconciling the independent counting of said A multiplicity accumulator with said R+A multiplicity accumulator.

7. A method of improving the precision of at least one of neutron coincidence counting and neutron multiplicity counting, said method including the steps of:
   a. sampling the real and accidental coincident pulses at the incoming pulse rate; and
   b. sampling said accidental coincidences at a clock rate, wherein said clock rate is much faster than said pulse rate.

8. The method of claim 7, wherein said clock rate is faster than said pulse rate by a factor of 5 to 10.

9. The method of claim 7, wherein said clock rate is, approximately, 4 MHz.

* * * * *